E. & G. LOISEAU.
SPRING LINK FOR BRACELETS OR EXTENSIBLE CHAINS.
APPLICATION FILED JULY 18, 1911.
1,037,274.   Patented Sept. 3, 1912.
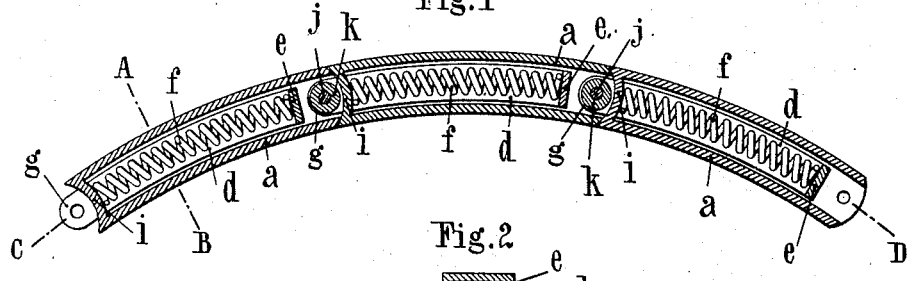
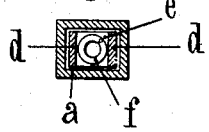
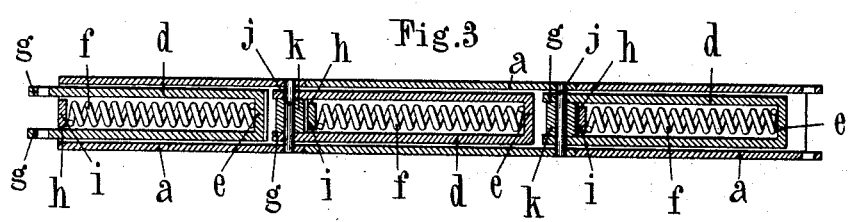
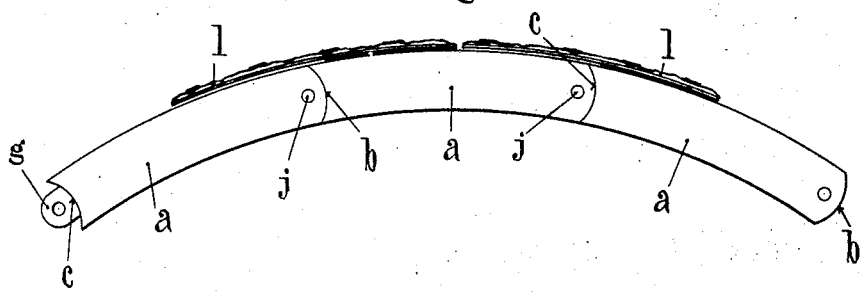
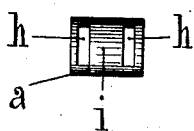

UNITED STATES PATENT OFFICE.

EDMOND LOISEAU AND GEORGES LOISEAU, OF PARIS, FRANCE.

SPRING-LINK FOR BRACELETS OR EXTENSIBLE CHAINS.

1,037,274.  Specification of Letters Patent.  Patented Sept. 3, 1912.

Application filed July 18, 1911. Serial No. 639,134.

*To all whom it may concern:*

Be it known that we, EDMOND LOISEAU and GEORGES LOISEAU, both citizens of the Republic of France, residing at Paris, in France, have invented certain new and useful Improvements in Spring-Links for Bracelets or Extensible Chains, of which the following is a full, clear, and exact description.

This invention has for its object a new or improved spring link for bracelets and extensible chains, by means of which all the forms of links or bands required by fashion can be reproduced.

Each link comprises a tube which may be of square, rectangular, oval or any other suitable section, and of any length and width. Furthermore, each link being very narrow and plain it readily admits of ornamentation by means of objects which are attached and conceal it. One end of the link is of convex form while the other end is concave so that two consecutive links fit one into the other. The two ends of each link may also in certain cases be flat and the links be without ornaments.

The invention consists in the novel construction, arrangement and combination of parts as hereinafter fully described, illustrated in the accompanying drawing and pointed out in the appended claims.

In the drawing: Figure 1 is a longitudinal section of three connected links. Fig. 2 is a transverse section of a link taken on line A—B in Fig. 1. Fig. 3 is a horizontal section of the links taken on line C—D of Fig. 1. Fig. 4 is a side view of the links. Fig. 5 is an end view of the concave extremity of a link.

Each of the links "$a$" forming a part of the bracelet or the chain is, for example, of hollow rectangular section and one of its ends is formed by a convex part "$b$," provided with rivet or pin holes and fitting into the concave end "$c$," of the next link. In the interior of each link a U-shaped strip "$d$," is fitted to slide, the transversely-disposed part "$e$," of the strip serving as a point of support for a spring "$f$," while the two free ends "$g$," "$g$," that project from the outer sleeve are provided with pin holes by means of which the strip "$d$," is jointed to the next link. The ends "$g$," of the bent strip "$d$" enter openings "$h$" formed in a concave seating "$i$," in the end of the link which prevents any deformation and preserves the proper form of the bracelet. The seating "$i$" thus serves as a second abutment for the spring "$f$," which cannot get out of shape during action, being maintained in position by the bent strip "$d$." The joining of one link to another is effected by means of a pin "$j$," which is inserted in the holes in the convex end of the link and passes through the holes in the ends "$g$," of the strip "$d$" containing the spring "$f$," which is inserted in the next link. The spacing between the ends "$g$" of the strip "$d$" is effected by a small sleeve "$k$" surrounding the pin "$j$."

A bracelet made in accordance with this invention may be easily lengthened by pulling the links apart, the springs "$f$" being compressed, which is preferable to applying tension, said springs then returning to their original position, the links thus joined being always well jointed. The links thus put together enable ornamental objects "$l$," to be soldered on as shown in Fig. 4, this in no way interfering with the pinning, thus avoiding any spaces between the ornaments which can be placed near together giving the bracelet the appearance of an ordinary ornamental bracelet. The bracelets made in this manner might comprise several rows of links placed side by side and joined together by any devices whatever. The ends of the links might be arranged with extensions forming sheaths sliding one over the other so as to hide the interior of the links when the bracelet is being extended.

What we claim is:

1. Spring links for bracelets and extensible chains each comprising a tubular member having its two ends respectively convex and concave, the convex part being open and the concave part being closed by a seating or abutment, a spring inclosed in the tube and bearing with one end against the closed end of the tube, a strip mounted to slide in the tube between the spring and tube and forming an abutment for the other end of the spring, the ends of the sliding strip belonging to one link being guided in openings in the abutment of the adjacent link and being connected by a pin to the convex end of the said link.

2. Spring links for bracelets and extensible chains each comprising a tubular member having its two ends respectively convex and concave, the convex part being open and the concave part being closed by a seating or abutment, a spring adapted to act by compression inclosed in the tube and bearing with one end against the closed end of the tube, a strip mounted to slide in the tube between the spring and tube and forming an abutment for the other end of the spring, the ends of the sliding strip belonging to one link being guided in openings in the abutment of the adjacent link and being connected by a pin to the convex end of the said link.

In testimony whereof we affix our signatures in presence of two witnesses.

EDMOND LOISEAU.
GEORGES LOISEAU.

Witnesses:
 MAURICE PICARD,
 H. C. COXE.